Patented Jan. 1, 1924.

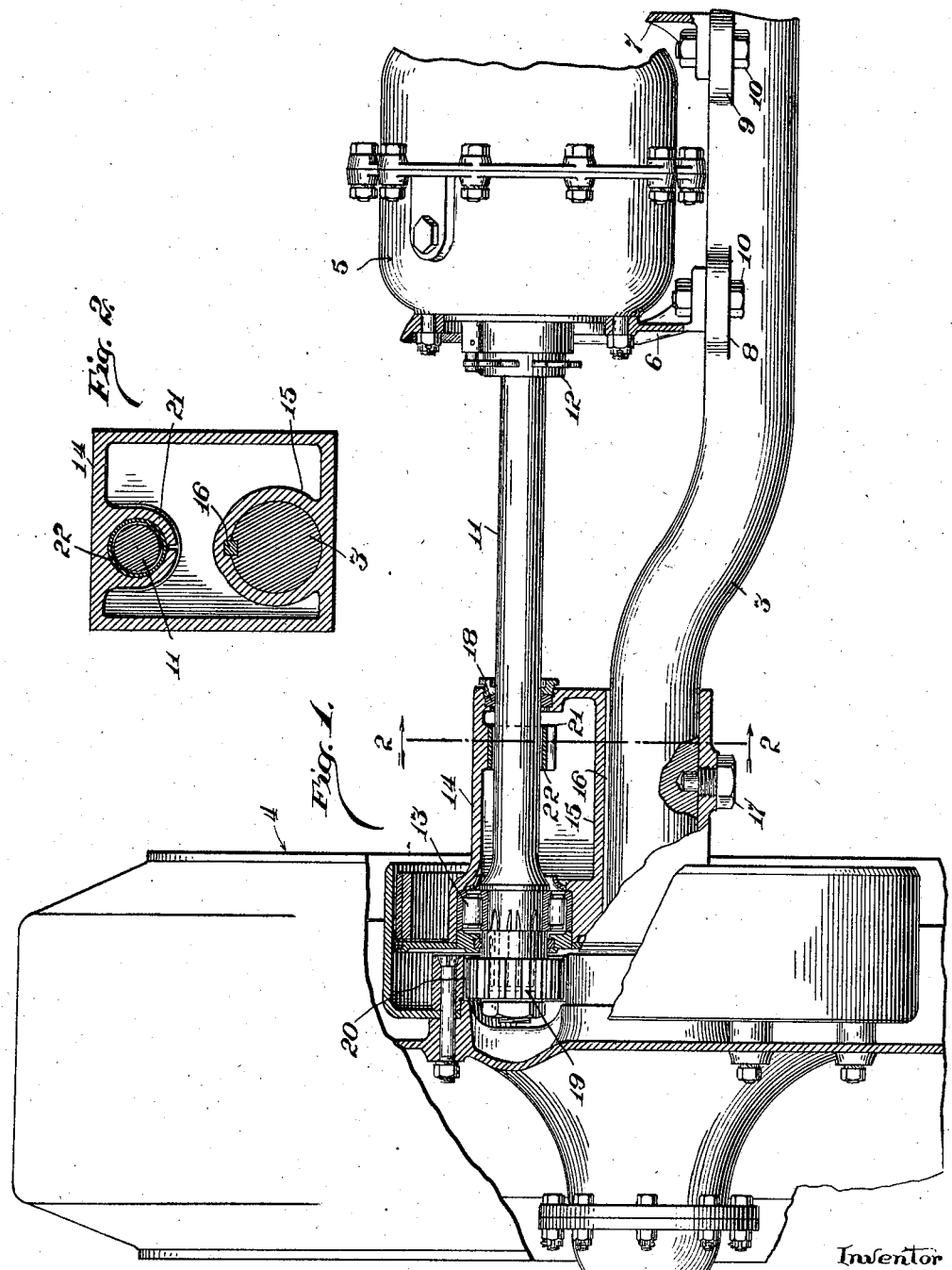

1,479,220

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

Application filed July 12, 1919. Serial No. 310,425.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor Vehicles, of which the following is a specification, reference being had to the accompanying drawings.

My invention relates to vehicle axles of the type in which the propelling wheels are mounted upon spindles carried by a dead axle member and are driven by a live axle member comprising jack shafts connected at their inner ends with the usual differential gearing and provided at their outer ends with pinions which mesh with driving gears carried by the wheels of the vehicle. The outer end portions of the jack shafts are supported by bearings adjacent to the inner ends of such pinions. Such axles are usually applied to trucks and other heavy load-carrying vehicles, and it has been found that when running on low gear, as in starting, or under other conditions where heavy strain is imposed upon the driving gear, the jack shafts have a tendency to buckle or be deflected intermediately, with the result that the outer end portions thereof are tilted or deflected in such manner that the teeth of the pinions do not mesh properly with the teeth of the driving gears. This, of course, is apt to cause the teeth to be damaged, and to avoid such deflection of the jack shafts without making them extra heavy is the principal object of my invention. A further object is to avoid lubrication difficulties in connection with the means by which my principal object is accomplished. The nature and characteristic features of my invention will fully appear from the following description of the embodiment thereof illustrated in the accompanying drawings.

In the drawings, in which I have illustrated my invention as applied to an axle in which the differential housing and the jack shafts are arranged above and in substantially the same vertical plane as the dead axle member,—

Fig. 1 is a rear elevation of part of an axle, certain parts being shown in section and part of the wheel shown being broken away; and Fig. 2 is a vertical cross-section on line 2—2 of Fig. 1.

Referring to the drawings, 3 indicates the dead axle member which is provided with the usual wheel spindles at its ends. 4 indicates one of the wheels mounted on the dead axle member 3 in any suitable way. 5 indicates the differential housing which is mounted upon the dead axle member 3 at the central portion thereof by means of brackets 6—7 secured to lugs 8—9 carried by the dead axle member 3, bolts 10 being preferably employed for that purpose. The differential housing 5 contains the usual differential gearing driven in any suitable way, as by a propeller shaft connected with the power plant. 11 indicates one of the jack shafts, of which there are two extending in opposite directions from the differential gearing over the dead axle member 3. The inner ends of these jack shafts are mounted in suitable bearings 12 at opposite sides of the differential housing 5, into which said jack shafts extend in the usual way, and their outer end portions are mounted in suitable anti-friction bearings 13 supported by the end portions of the dead axle member 3. In the construction illustrated, these anti-friction bearings are fitted in suitable pockets or recesses in housings 14 fitted upon and non-rotatably secured to the end portions of the dead axle member 3 adjacent to the wheel spindles thereof, as shown in Fig. 1. It will be understood that the two jack shafts and their connections are similar, so that the description of one applies to both. The housing 14 is provided with an internal sleeve 15 which fits upon the end portion of the dead axle member 3 and is non-rotatably secured thereto by a key 16, as shown in Fig. 2. It is also secured against endwise movement by a set screw 17, shown in Fig. 1. This housing is designed to contain an oil reservoir equipped with means for supplying oil to the bearing 13, as fully shown and described in my application for patent filed of even date herewith, Serial No. 310,426, but as the particular construction of such oil reservoir and the parts associated therewith has nothing to do with my present invention, they are not illustrated. As shown in Fig. 1, the jack shaft 11 extends through the housing 14, and where it enters said housing a stuffing-box 18 is provided to prevent dust and dirt from entering the chamber formed by said housing. At its outer end the jack shaft 11 carries a spur pinion 19 which is adapted to engage a gear, preferably an internal gear, 20 carried by the wheel, for driving the same.

21 indicates an intermediate bearing for the jack shaft 11 which, in the construction illustrated, is formed on the inside of the housing 14 at the upper portion thereof, and surrounds the jack shaft 11 at a point between its ends and preferably nearer its outer than its inner end. Said bearing is provided with a bushing 22, the internal diameter of which is preferably slightly greater than that of the jack shaft 11 so that there is normally a small amount of clearance between them, ordinarily in practice about one-thirty-second of an inch. In the normal operation of the vehicle as at ordinary running speed on a level road, the bearing 21 performs no function as the jack shaft is not in contact with it. When, however, extraordinary strain is imposed upon the driving gears, as when starting, since the end of the jack shaft on which the pinion 19 is mounted overhangs the shaft bearing 13, there is a tendency to deflect the shaft intermediately, or bow it, so that the pinion 19 moves partly out of mesh with the gear 20, with consequent danger of causing damage to their teeth. This deflection or bowing, is, however, prevented by the intermediate bearing 21, with the result that the driving gears are always held properly in mesh with each other. This construction makes it practicable to use jack shafts considerably lighter than would be required if the intermediate bearings 21 were not provided. By making the intermediate bearing of slightly greater diameter than the jack shaft so that under normal conditions it is not engaged by the jack shaft, lubrication difficulties are minimized since the jack shaft only occasionally frictionally engages said bearing, and, therefore, only a small amount of lubricant is necessary to be supplied.

By placing the intermediate bearing inside the housing 14 it is not only fully protected from dirt, but is also lubricated by the lubricating devices therein, as the oil supplied to the bearing 13 flows along the jack shaft to and lubricates the intermediate bearing. So far as my present invention is concerned, however, it will be understood that any suitable lubricating means may be employed.

While I have shown and described my invention applied to a rear axle in which the jack shafts are arranged vertically above the dead axle member, it may also be applied to axles in which the jack shafts are otherwise arranged, and the claims hereinafter made are therefore to be construed accordingly.

What I claim as my invention and desire to secure by Letters Patent, is—

1. A motor vehicle axle comprising a dead axle member, a differential housing, jack shafts having bearings at their inner end portions in said differential housing and having bearings at their outer end portions supported by said dead axle member, pinions mounted on said jack shafts outside of the latter bearings, and intermediate circular bearings for said jack shafts, said intermediate bearings being normally inoperative and being brought into operation by deflection of said jack shafts.

2. An axle comprising a dead axle member, a differential housing secured centrally thereto, housings mounted on the outer end portions of said dead axle member, jack shafts extending through the latter housings and having bearings at their inner end portions in said differential housing, bearings for said jack shafts carried by the housings at the outer end portions of said dead axle member, pinions mounted on the outer end portions of said jack shafts outside of the latter bearings, and intermediate circular bearings for said jack shafts in the latter housings, said jack shafts being normally out of contact with said intermediate bearings and being movable by lateral deflection into engagement therewith.

3. An axle comprising a dead axle member, a differential housing secured centrally thereto, housings mounted on the outer end portions of said dead axle member and adapted to contain lubricant, jack shafts having bearings at their inner end portions in said differential housing, bearings for said jack shafts carried by the housings at the outer end portions of said dead axle member, means in the latter housings for lubricating the latter bearings, and intermediate circular bearings for said jack shafts in the latter housings, said jack shafts being normally out of contact with said intermediate bearings and being movable by lateral deflection into engagement therewith.

ROBERT J. BURROWS.